US010050934B2

United States Patent
Singleton, IV et al.

(10) Patent No.: US 10,050,934 B2
(45) Date of Patent: Aug. 14, 2018

(54) REDIRECTOR FOR SECURE WEB BROWSING

(71) Applicant: Citrix Systems, Inc., Fort Lauderdale, FL (US)

(72) Inventors: Leo C. Singleton, IV, Fort Lauderdale, FL (US); Juan Rivera, Doral, FL (US); Jitendra Deshpande, Pompano Beach, FL (US); Sridhar Mullapudi, Parkland, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 461 days.

(21) Appl. No.: 14/815,066

(22) Filed: Jul. 31, 2015

(65) Prior Publication Data
US 2017/0034127 A1 Feb. 2, 2017

(51) Int. Cl.
*G06F 17/00* (2006.01)
*H04L 29/06* (2006.01)
*H04L 29/12* (2006.01)
*G06F 21/53* (2013.01)
(Continued)

(52) U.S. Cl.
CPC .... *H04L 63/0236* (2013.01); *G06F 17/30861* (2013.01); *G06F 21/53* (2013.01); *H04L 61/1511* (2013.01); *H04L 61/2503* (2013.01); *H04L 63/102* (2013.01);
(Continued)

(58) Field of Classification Search
CPC ........ G06F 21/51; G06F 21/53; G06F 21/121; G06F 21/128; G06F 2221/2149; H04L 63/00–63/029
See application file for complete search history.

(56) References Cited

U.S. PATENT DOCUMENTS

2008/0275888 A1 11/2008 Shuster
2010/0192224 A1* 7/2010 Ferri ................. G06F 21/53
726/23

(Continued)

FOREIGN PATENT DOCUMENTS

KR 101459261 B1 11/2014

OTHER PUBLICATIONS

Oct. 25, 2016—(WO) International Search Report and Written Opinion—App PCT/US2016/044643.
(Continued)

*Primary Examiner* — Daniel B Potratz
(74) *Attorney, Agent, or Firm* — Banner & Witcoff, Ltd.

(57) ABSTRACT

Methods, systems, and computer-readable media for redirecting a web browser application for secure web browsing are described herein. In various embodiments, a user web browser application executing within a secure network may request the content of a website outside of the secure network. In response to the request, an address translation service may redirect the user web browser application to a redirector service to respond to the request. In response to the request, the redirector service may request a hosted web browser application that may be able to navigate to the requested website. In further response to the request, the redirector service may send, to the user web browser application, a client agent which may display the output generated by a hosted web browser application within the user web browser application.

20 Claims, 8 Drawing Sheets

(51) Int. Cl.
*H04L 29/08* (2006.01)
*G06F 17/30* (2006.01)
(52) U.S. Cl.
CPC ........ *H04L 63/126* (2013.01); *H04L 67/2814* (2013.01); *H04L 67/34* (2013.01)

(56) References Cited

U.S. PATENT DOCUMENTS

| | | | | |
|---|---|---|---|---|
| 2012/0069401 | A1* | 3/2012 | Fages | G06F 21/305 358/1.15 |
| 2014/0258528 | A1* | 9/2014 | Miller | H04L 47/70 709/225 |
| 2015/0156203 | A1* | 6/2015 | Giura | H04L 63/101 726/4 |
| 2016/0154539 | A1* | 6/2016 | Buddhiraja | G06F 9/45558 715/738 |
| 2016/0292420 | A1* | 10/2016 | Langton | G06F 21/566 |
| 2016/0294797 | A1* | 10/2016 | Martin | H04L 63/0236 |
| 2017/0206348 | A1* | 7/2017 | Ghosh | G06F 21/53 |

OTHER PUBLICATIONS

Alberto Rodrigues Da Silva et al. "Web-Based Agent Applications: User Interfaces and Mobile Agents" Telecommunications and IT Convergence Towards SErvice E-Volution; Springer Berlin Heidelberg, Berlin, Heidelberg, pp. 135-153, XP019074179, ISBN: 978-3-540-67152-7 Chapter 2.

* cited by examiner

REDIRECTOR FOR SECURE WEB BROWSING

FIELD

Aspects described herein generally relate to computers, networking, hardware, and software, and security measures in place therein. More specifically, some aspects herein relate to redirection of a web browser. One or more aspects of the disclosure relate to redirecting a web browser using a redirector service and a client agent to present a remote web browser application.

BACKGROUND

Enterprises (e.g., corporations, partnerships, governments, academic institutions, other organizations, etc.) face continuously increasing risks of malicious attacks waged against their computer networks and assets. The magnitude and complexity of the situation is further increased by the current trend towards BYOD—bring your own device. BYOD environments allow enterprise employees to use their own devices for work purposes, such as, mobile phones, smartphones, tablets, laptops, personal computers, or other electronic devices, in addition to the computer resources provided by the enterprise. However, BYOD scenarios pose inherent security risks because the enterprise typically lacks uniform and full control over each employee-provided device.

Some enterprises have mitigated the risks described above by deploying and maintaining secure networks that limit access to and from outside of the network (e.g., the Internet), as well as, by using virtualized environments that allow enterprise employees to access non-secure resources from within the secure network in a manner that does not impose a risk on the secure network. Techniques for instantiating an application in a virtualized environment are well known in the art. Such an application may be instantiated on a virtualization server and a counterpart remote application may be rendered on a user's computing device.

A common use of application virtualization is to publish hosted web browser applications. An enterprise may have several motives for publishing hosted web browser applications. Among them, an enterprise may publish a web browser to provide enterprise users with access to websites that would otherwise be inaccessible from within the secure network (e.g., websites which require access to the Internet) or websites that have been determined to be typically non-work related or would otherwise pose a security risk to the secure network. For example, a marketing employee may need to access a social media web application for work purposes rather than personal purposes. In another scenario, an enterprise may have implemented a policy that requires a specific type and version of web browser application but an employee (or group of employees) requires access to a website that is not compatible with the enterprise's approved web browser application. Rather than risk security issues by allowing those employees to install an unapproved web browser application, the enterprise may publish hosted web browsers that are of a type and version that is compatible with the required website. For example, an enterprise may require the use of the Internet Explorer® web browser application, manufactured by the Microsoft Corporation of Redmond, Washington, and it might not be capable of displaying the content of a webpage that is only compatible with a CHROME web browser application, manufactured by the Google Corporation of Mountain View, Calif.

However, the user experience of using a hosted web browser application to visit a website differs in difficulty and complexity from the user experience of using a local web browser application to perform the same task. In the hosted web browser application scenario, the user needs to install a client application, start the client application, start the hosted web browser application from the client, and then navigate the web browser to the desired website. In addition, the hosted web browser may be of a different type and/or version than the web browser application installed in the user's computing device. Thus, the user must learn how to use multiple types and/or versions of web browser applications.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards systems, methods, and techniques for redirecting a user web browser application such that the web browser application can access websites that would typically be inaccessible from a secure corporate network, or to access websites that are not compatible with the type and/or version of the user's web browser application.

The method may comprise receiving, by an address translation service, from an user web browser application executing in a secure network, a first request for a website; providing, by the address translation service, and responsive to the first request, a network address of a redirector service if or when the website meets predefined criteria; receiving, by the redirector service, a second request from the user web browser application for the website; requesting, by the redirector service, a hosted web browser application executing on an unsecured network, wherein the request by the redirector service identifies the website; navigating the hosted web browser application to the website; sending, by the redirector service to the user web browser application, a client agent for execution within the user web browser application, wherein the client agent may have been preconfigured to present the hosted web browser The network address of the redirector service provided by the address translation service may comprise an internet protocol (IP) address. In other embodiments, the network address of the redirector service provided by the address translation service may comprise an uniform record locator (URL) address. The method may further comprise a second request from the user web browser application which comprises a uniform record locator (URL) of the website. Furthermore, the redirector service may transmit the uniform record locator of the website to the hosted web browser application.

In some embodiments, the address translation service may comprise a domain name system (DNS) configured to provide, responsive to an address request for a first set of websites, the address of the redirector service, and responsive to an address request for a second set of websites, the address of the respective website within the second set of websites, based on predetermined criteria. In other embodiments, the address translation service may comprise a web proxy service configured to intercept requests for a first set of websites and relay the requests to the redirector service and configured not to intercept requests for a second set of websites, based on predetermined criteria.

The method may further comprise a redirector service which comprises a plurality of load-balanced redirector services. In other embodiments, the hosted web browser application may be executing in a hosted farm of web browser applications. In another embodiment, the redirector service requesting the hosted web browser application may be assigned a pre-launched hosted web browser application in response to the request.

Alternatively, in yet other embodiments, the method may further comprise, responsive to the redirector service requesting the hosted web browser application, retrieving content and properties of the website, analyzing the content and properties of the website, and determining, based on the content and properties of the website, a type and version of hosted web browser application to launch in response to the request from the redirector service.

Systems and non-transitory computer readable media may be configured to provide and/or support various aspects described herein. These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards systems, methods, and techniques for redirecting a user web browser application such that the web browser application can access websites that would typically be inaccessible from a secure corporate network, or to access websites that are not compatible with the type and/or version of the user's web browser application. Aspects described herein may be used when an employee of an enterprise may need to use a website located outside of the enterprise's secure network (e.g., a marketing employee may need to access a social media web application for work purposes.) Other aspects described herein may be used to provide access to a website that would otherwise might not be accessible due to browser type and/or version compatibility issues.

Before discussing these concepts in greater detail, however, several examples of computing architecture and systems that may be used in implementing and/or otherwise providing various aspects of the disclosure will first be discussed with respect to FIGS. 1-4.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
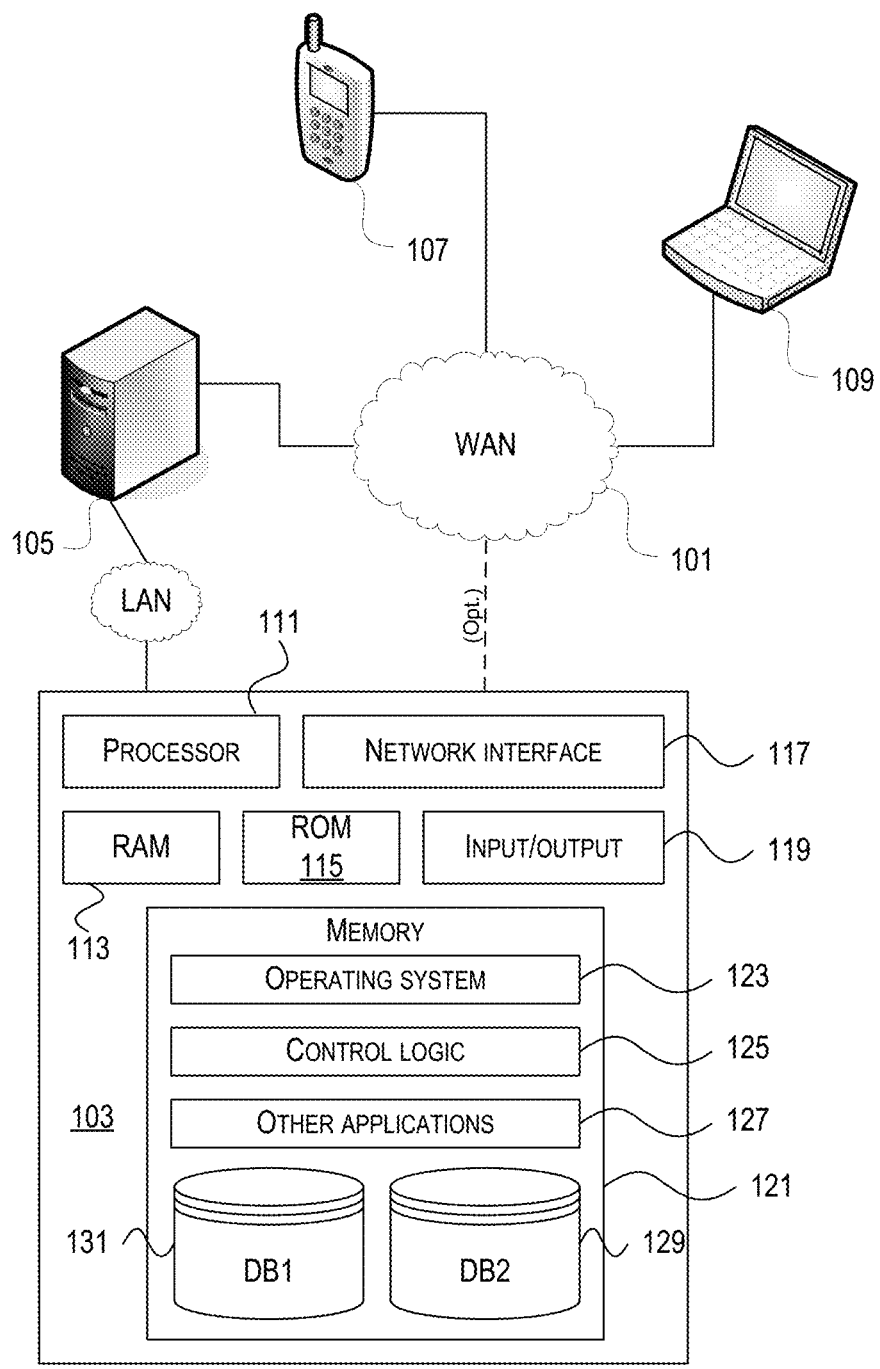
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
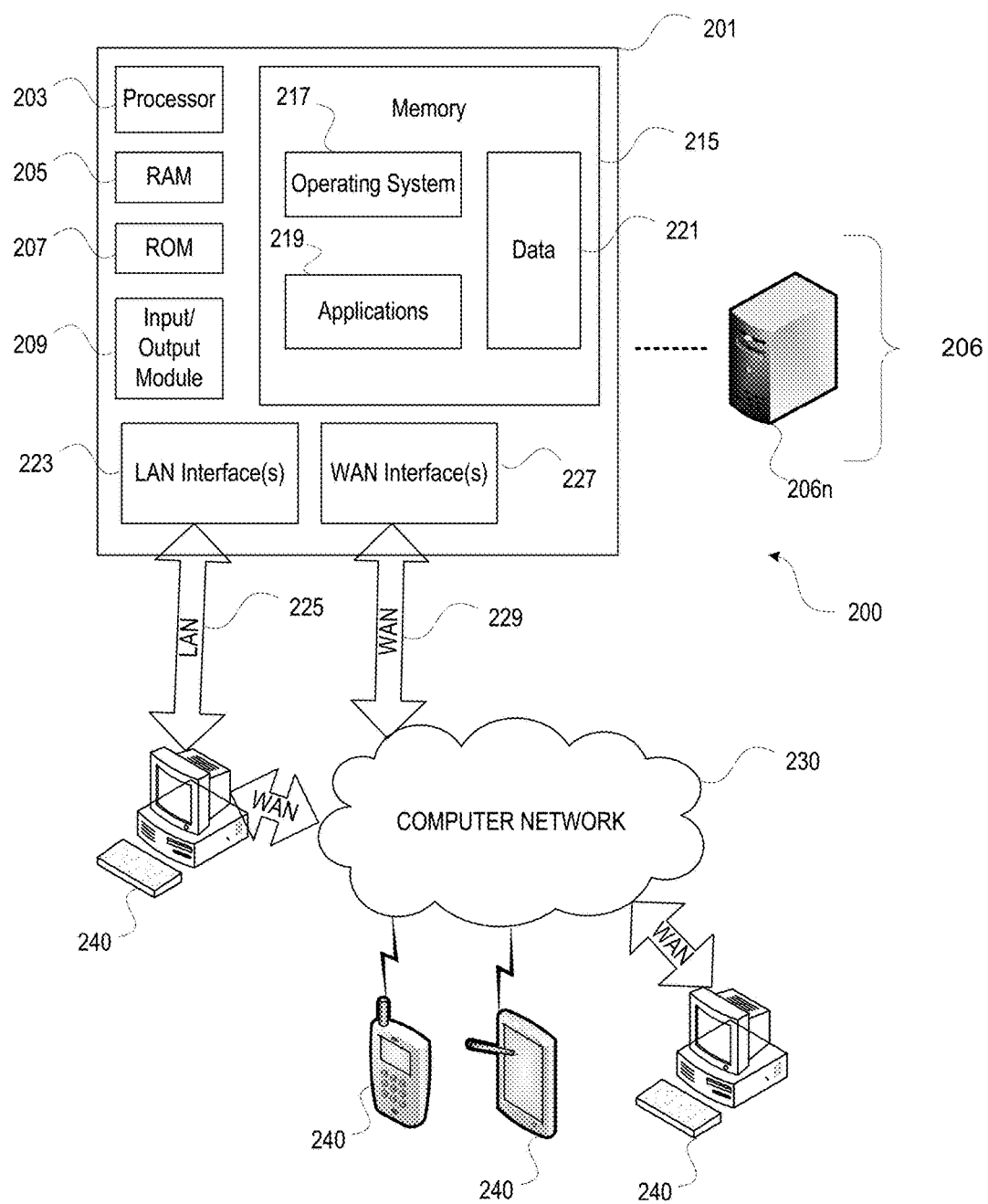
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including RAM 205, ROM 207, I/O module 209, and memory 215.

I/O module 209 may include a mouse, keypad, touch screen, scanner, optical reader, and/or stylus (or other input device(s)) through which a user of generic computing device

201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b, and responds to the request generated by the client machine 240 with a response from the second server 206b. First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
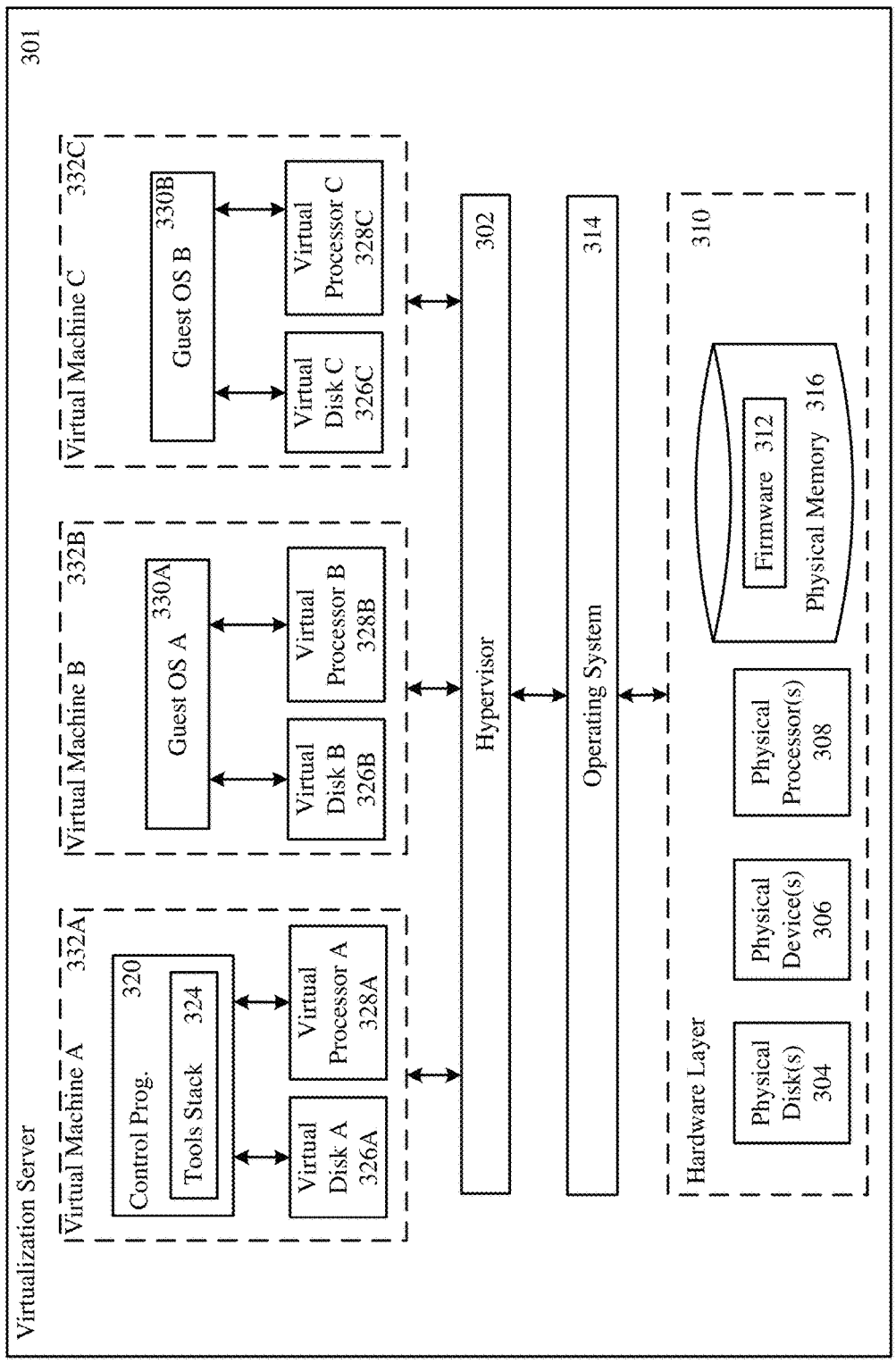
FIG. 3 depicts an illustrative virtualized (hypervisor) system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308 and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more memory 216. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor that executes within an operating system 314 executing on the virtualization server 301. Virtual machines then execute at a level above the hypervisor. In some embodiments, the Type 2 hypervisor executes within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316 and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 controls processor scheduling and memory partitioning for a virtual machine 332 executing on virtualization server 301. Hypervisor 302 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, virtualization server 301 executes a hypervisor 302 that creates a virtual machine platform on which guest operating systems may execute. In these embodiments, the virtualization server 301 may be referred to as a host server. An example of such a virtualization server is the XEN SERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may executes a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may presents at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, provides each virtual machine 332 with a unique virtual view of the physical hardware, memory, processor and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
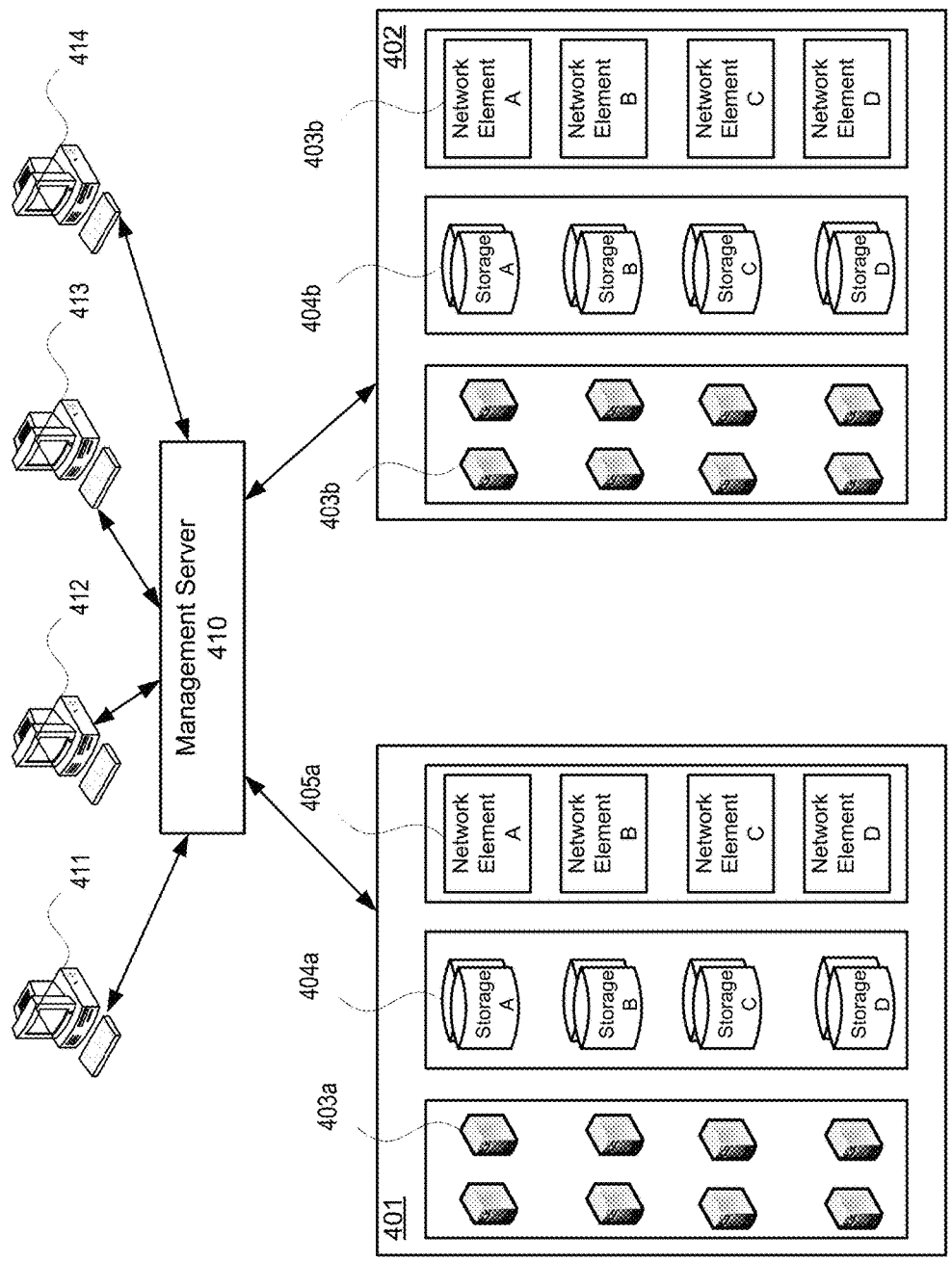
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403, storage resources 404, and network resources 405) of the cloud system.

Management server 410 may be implemented on one or more physical servers. The management server 410 may run, for example, CLOUDSTACK by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system. For example, the management server 410 may provide a set of application programming interfaces (APIs) and/or one or more cloud operator console applications (e.g., web-based on standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management sever 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Washington), AMAZON EC2 (Amazon.com Inc. of Seattle, Wash.), IBM BLUE CLOUD (IBM Corporation of Armonk, N.Y.), or others.

Web Brower Redirection

Having discussed several examples of the computing architecture that may be used in providing and/or implementing various aspects of the disclosure, a number of embodiments will now be discussed in greater detail. In particular, and as introduced above, some aspects of the disclosure generally relate to redirecting a user web browser application to a hosted web browser application that provides access to an unsecure or to an incompatible website that would otherwise be inaccessible by a user's existing web browser application. In the description below, various examples illustrating how a user web browser application may be redirected in accordance with one or more embodiments will be discussed.

Figure 5:
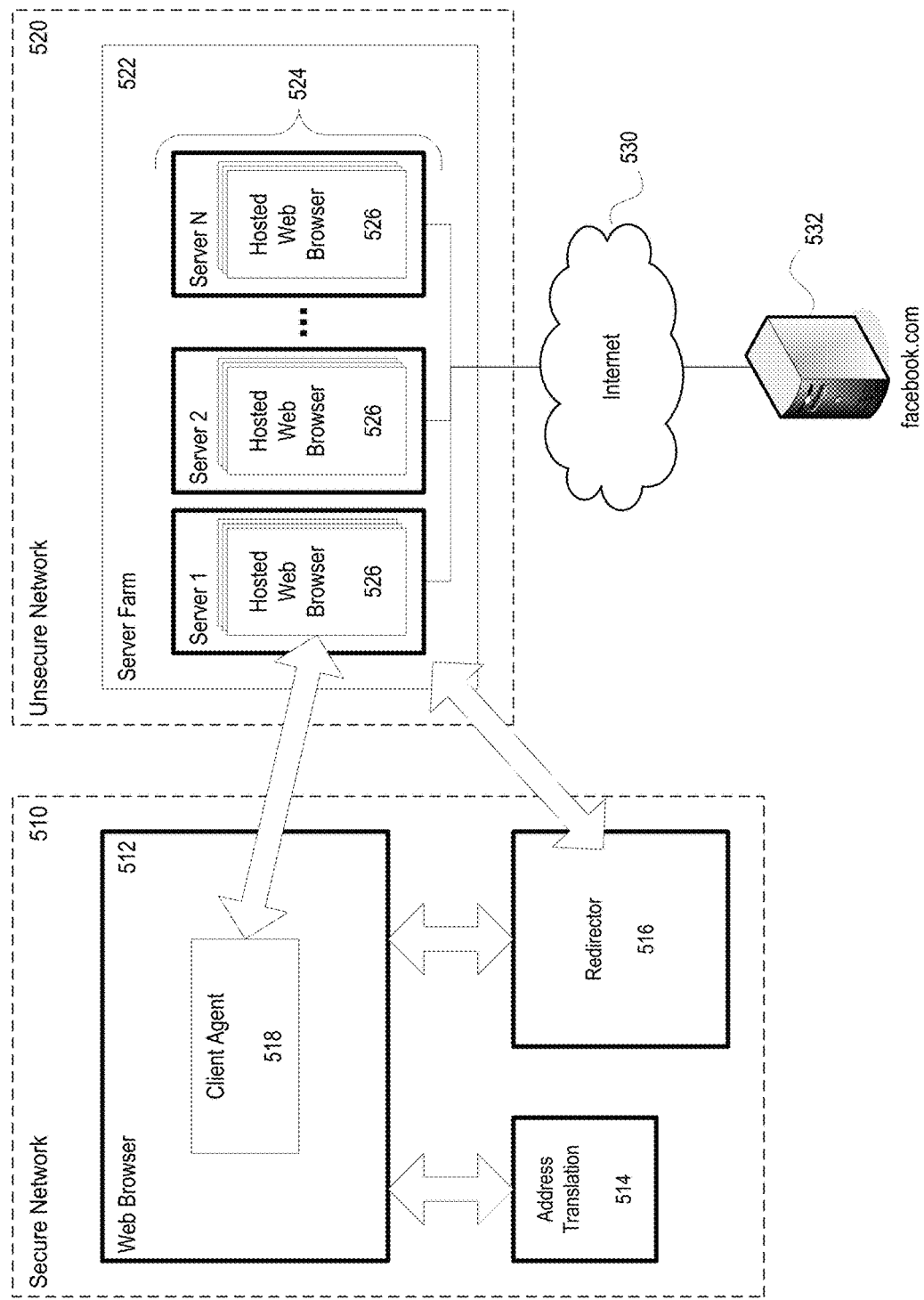
FIG. 5 depicts an illustrative system architecture in which a redirector service redirects a user web browser application executing in a secure network to a hosted web browser application presenting a website outside of the secure network, according to one or more illustrative aspects described herein.

FIG. 5 shows an illustrative system architecture in which a user web browser application 512 may execute within a secure network 510 to access an unsecure website 532. The user web browser application 512, an address translation service 514 (e.g., a DNS server), and a redirector service 516 may communicate with each other and execute within a secure network 510. Secure network 510 is for illustration purposes and may be replaced with fewer or additional computer networks.

The user web browser application 512 may in one embodiment be a web browser application executing in a client computing device (e.g., device 109, 240, etc.). The user web browser application 512 might not be able to access the unsecure website 532. Access to the unsecure website 532 may be provided via a hosted web browser application 526 executing within unsecure network 520. The user web browser application 512 may be configured to generate address translation requests directed to the address translation service 514 (e.g., DNS calls). The user web browser application 512 may be configured to generate website content requests using the network address provided by the address translation service 514. The network address provided by the address translation service 514 may contain an internet protocol (IP) address or a uniform record locator (URL) address, or any other usable web site address. The website request may be directed to the intended website or redirected to the redirector service 516 based on the response from the address translation service 514 to the user web browser application 512 request for the network address of the website.

The address translation service 514 may respond to the request from the user web browser application 512 with the network address of the requested website if or when the requested website is a secure website that the user web browser application 512 may be allowed to access directly. The address translation service 514 may respond to the request from the user web browser application 512 with the network address of the redirector service 516 if or when the requested website is an unsecure website that the user web browser application 512 might not be allowed to access directly. According to an illustrative aspect, the address translation service 514 may be a Domain Name System (DNS.) In such an embodiment, the domain name system may contain or be configured with records that translate the domain names of unsecured websites to the network address of redirector service 516. The domain name system may also contain or be configured with records that translate the domain names of secured websites to the network address for the secured website. In another embodiment, the address translation service 514 may be a web proxy. In such an embodiment, the web proxy may be configured to intercept requests directed to the unsecured websites and redirect them to the redirector service 516. The web proxy may be configured to not intercept requests directed to secure websites.

The redirector service 516 may in response to a redirected request for a website from a user web browser application 512 request a hosted web browser application 526 that may execute in an unsecured network. The hosted web browser application 526 may be hosted on a server 524 in a single-server or multi-server virtualization system (e.g., a remote access or cloud system) configured to provide virtual machines for web browser applications. In one embodiment, the hosted web browser application 526 may be launched in response to the request from the redirector service 516. In another embodiment, server farm 522 may have pre-launched a set of one or more hosted web browser applications 526a-526n and the redirector service 516 may be assigned one of the pre-launched hosted web browser applications 526a-526n in response to the request. The selected hosted web browser application 526 may navigate to the unsecure website 532 via a network 530 (e.g., the Internet.) The redirector service 516 may respond to the user web browser application 512 by providing a client agent 518 that executes within the user web browser application 512. The client agent 518, e.g., a client agent such as CITRIX RECEIVER, may use a remote presentation protocol to display the output generated by the hosted web browser application 526 to the user web browser application 512. The client agent 518 may also transmit navigation commands from the user web browser application 512 to the hosted web browser application 526.

In another embodiment, the user web browser application 512 may contain a digital certificate signed by a trusted certification authority (CA). The redirector service 516 may contain the private key from the trusted CA certificate, with which it may impersonate the user web browser application 512 if using the secure HTTP protocol to connect to the requested unsecure website 532. In such an embodiment, the user web browser application 512 might not generate a warning message if the requested unsecure website 532 used the secure HTTP protocol, thus allowing for a seamless connection to the unsecure website 532.

FIG. 5 illustrates just one example of a network architecture that may be used, and those of skill in the art will appreciate that the specific network architecture and data processing devices used may vary, and are secondary to the functionality that they provide, as further described herein. For example, services provided by address translation service 514 and redirector service 516 may be combined on a single server or may be load balanced across a plurality of servers.

Figure 6:
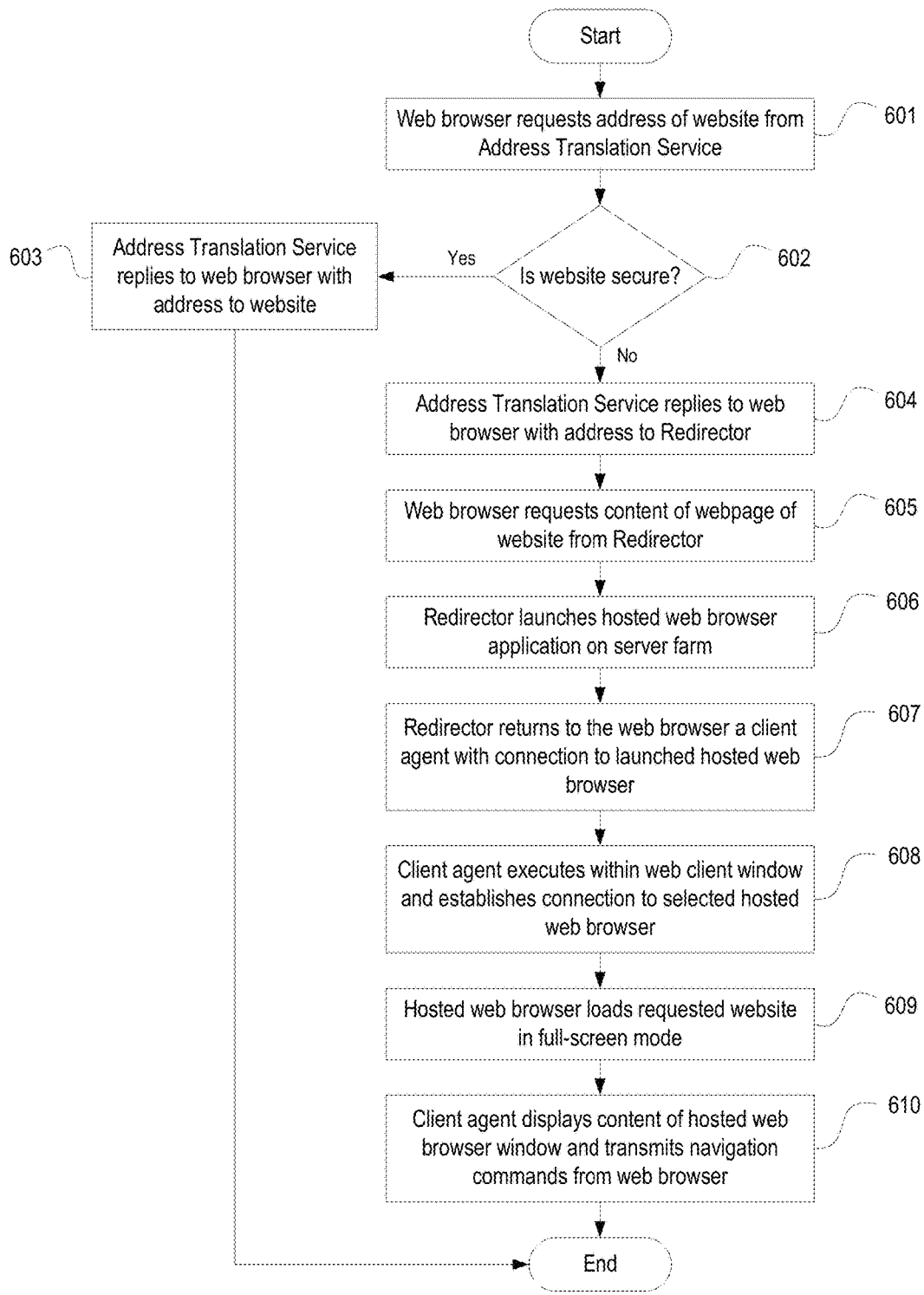
FIG. 6 illustrates a flow chart of a method used to redirect a user web browser application executing in a secure network to a hosted web browser application presenting a website outside of the secure network in accordance with one or more illustrative aspects described herein.

FIG. 6 depicts a flowchart that illustrates a method of redirecting a user web browser application to a hosted web browser application that provides access to an unsecure website. The algorithm shown in FIG. 6 and other similar examples described herein may be performed in a computing environment such as the system illustrated in FIG. 5, as well as other systems having different architectures (e.g., all or part of FIGS. 1-4). In other embodiments, the method illustrated in FIG. 6 and/or one or more steps thereof may be embodied in a computer-readable medium, such as a non-transitory computer readable memory.

In step 601, user web browser application 512 requests the network address of a website from the address translation service 514. For example, the request may be in response to a user entering a web address in a web browser. The address translation service 514 may have been pre-configured to respond to network address requests with the network address for a website if or when the website has been pre-determined to be a secure website. If or when the website is not secure, the address translation service 514 may have been pre-configured to respond to network address requests with the network address for a redirector service 516. In step 602, the address translation service 514 may determine whether the website in the network address request is secure or not based on its configuration data. If or when it is determined, in step 602, that the website is secure, then the address translation service 514 may respond to the user web browser application 512 request with the network address of the requested website, as shown in step 603, and the method ends.

If or when it is determined, in step 602, that the website is not secure, then the address translation service 514 may respond to the user web browser application 512 request with the network address of the redirector service 516, as shown in step 604. In step 605, the user web browser application 512 may send a website content request (e.g., an HTTP GET request) to the network address of the redirector service 516 provided by the address translation service 514 in step 604. In step 606, the redirector service 516 may receive the website content request and, in response to the request, the redirector service 516 may request a hosted web browser application 526 from farm 522. In step 607, the redirector service 516 may respond, to the user web browser application 512, with a response message that may comprise a client agent 518. The client agent 518 may comprise a plugin component, such as an ActiveX control or Java control or any other type and/or form of executable instructions capable of loading into and executing in the user web browser application 512. For example, the client agent 518 may comprise an ActiveX control loaded and run by a user web browser application 512, such as in the memory space or context of the user web browser application 512. In another embodiment, the redirector service 516 respond with a message that may comprise a designed and constructed program to obtain, download, or receive the client agent 518 via the network 510 from another computing device and install the client agent 518. The client agent 518 may be pre-configured to present the content of the hosted web browser application 526 within the user web browser application 512.

In step 608, the client agent 518 may connect to a server 524 using a thin-client or remote-display protocol to present display output generated by the hosted web browser application 526 executing on the server 524. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

In step 609, the hosted web browser application 526 may navigate to the requested unsecure website 532 in full-screen mode. In step 610, the client agent 518 may present the content of the unsecure website 532 on the user web browser application 512 in a seamless and transparent manner such that it appears that the content is being displayed by the user web browser application 512, e.g., based on the content being displayed in full screen mode. In other words, the user may be given the impression that the website content is displayed by the user web browser application 512 and not by the hosted web browser application 526. The client agent 518 may transmit navigation commands generated by the user web browser application 512 to the hosted web browser application 526 using the thin-client or remote-display protocol. Changes to the display output of the hosted web browser application 526, due to the navigation commands, may be reflected in the user web browser application 512 by the client agent 518, giving the impression to the user that the navigation commands were executed by the user web browser application 512.

Figure 7:
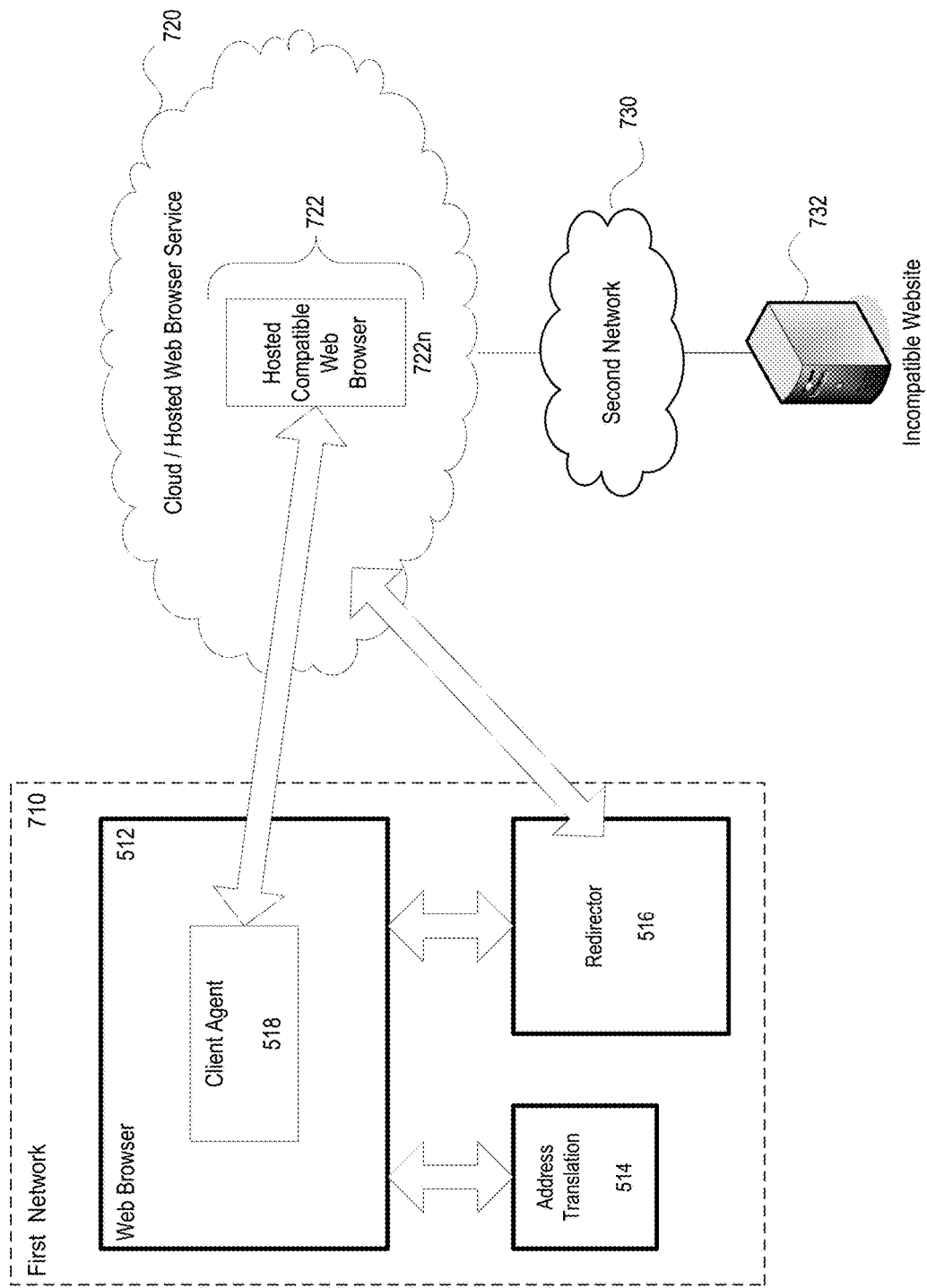
FIG. 7 depicts an illustrative system architecture in which a redirector service redirects an incompatible user web browser application to a hosted compatible web browser application, in accordance with one or more illustrative aspects described herein.

FIG. 7 shows an illustrative a block diagram of an embodiment of a user web browser application 512 executing within a first network 710 accessing a website 732 that is incompatible with the user's web browser application 512. The user web browser application 512, the address translation service 514, and the redirector service 516 may communicate with each other and execute within a first network 710. First network 710 and second network 730 are for illustration purposes and may be combined or replaced with fewer or additional computer networks.

The user web browser application 512 may in one embodiment be a web browser application executing in a client computing device. The user web browser application 512 might not be able to display the content of the website 732 due to browser type and/or version compatibility issues. Website 732 is thus referred to herein as an incompatible website. For example, an Internet Explorer® web browser application, manufactured by the Microsoft Corporation of Redmond, Wash., might not be capable of displaying the content of a webpage that is only compatible with a CHROME web browser application, manufactured by the Google Corporation of Mountain View, Calif. Similarly, Internet Explorer® version 10 might not be capable of displaying the content of a webpage that is only compatible with Internet Explorer® version 8, manufactured by the Microsoft Corporation of Redmond, Wash. In another example, Google CHROME might not support or may discontinue support for NPAPI-based plugins, and therefore another browser might be required to access a web site that utilizes such plugins. The user web browser application 512 may be configured to generate address translation requests directed to the address translation service 514. The user web browser application 512 may be configured to generate website content requests using the network address provided by the address translation service 514. The network address provided by the address translation service 514 may contain an internet protocol (IP) address or a uniform record locator (URL) address. The website request may be directed to the intended website or redirected to the redirector service 516 based on the response from the address translation service 514 to the user web browser application 512 request for the network address of the website.

The address translation service 514 may respond to the request from the user web browser application 512 with the network address of the requested website if the requested website is compatible with the type and version of the user web browser application 512. The address translation service 514 may respond to the request from the user web browser application 512 with the network address of the redirector service 516 if the requested website is not compatible with the type and version of the user web browser application 512. In one embodiment, the address translation service 514 may be a Domain Name System (DNS.) In such an embodiment, the domain name system may contain records that translate the domain names of incompatible websites to the network address of the redirector service 516. The domain name system may also contain records that translate the domain names of compatible websites to the network address for the compatible website. In another embodiment, the address translation service 514 may be a web proxy. In such an embodiment, the web proxy may be configured to intercept requests directed to the incompatible websites and redirect them to the redirector service 516. The web proxy may be configured to not intercept requests directed to compatible websites.

The redirector service 516 may in response to a redirected request for a website from a user web browser application 512 request a hosted compatible web browser application 722a that may execute in a cloud or hosted web browser service. The hosted compatible web browser application 722a may be hosted on a single-server or multi-server virtualization system 720 (e.g., a remote access or cloud system) configured to provide virtual machines for web browser applications. The hosted compatible web browser application 722a may navigate to the incompatible website 732 via a second network 730 (e.g., Internet.) The hosted compatible web browser application 722a may be a browser application of a type and version that may be compatible with the incompatible website 732. The redirector service 516 may respond to the user web browser application 512 by providing a client agent 518 that executes within the user web browser application 512. The client agent 518, e.g. a client agent such as CITRIX RECEIVER, may use a remote presentation protocol to display the output generated by the hosted compatible web browser application 722a to the user web browser application 512. The client agent 518 may also transmit navigation commands from the user web browser application 512 to the hosted compatible web browser application 722a.

In one embodiment, the redirector service 516 may be pre-configured to request a hosted compatible web browser application 722a of a specific type and version. In another embodiment, the redirector service 516 may retrieve the content and properties of the incompatible website 732 and may determine, based on an analysis of the content and properties of the incompatible website 732, a type and version of hosted compatible web browser application 722 to request from the hosted web browser service 720.

Figure 8:
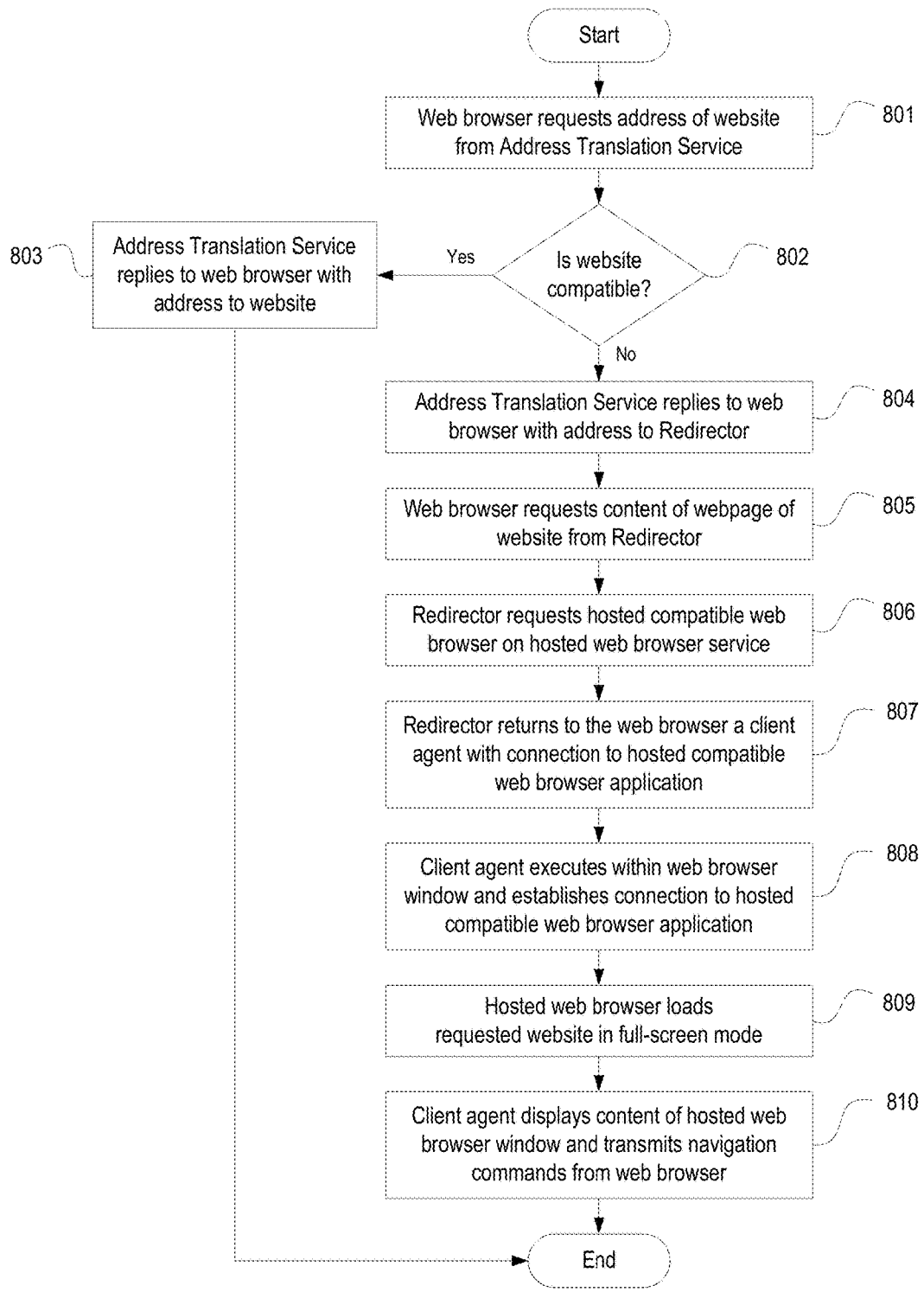
FIG. 8 illustrates a flow chart of a method used to redirect an incompatible user web browser application to a hosted compatible web browser application in accordance with one or more illustrative aspects described herein.

FIG. 8 depicts a flowchart that illustrates a method of redirecting a user web browser application to a hosted compatible web browser application that provides access to an incompatible website. The algorithm shown in FIG. 8 and other similar examples described herein may be performed in a computing environment such as the system illustrated in FIG. 7, as well as other systems having different architectures. In other embodiments, the method illustrated in FIG. 8 and/or one or more steps thereof may be embodied in a computer-readable medium, such as a non-transitory computer readable memory.

In step 801, the user web browser application 512 requests the network address of a website from the address translation service 514. For example, the request may be in response to a user entering a web address in a web browser. The address translation service 514 may have been pre-configured to respond to network address requests with the network address for a website if the website has been pre-determined to be a compatible website. If the website is not compatible, the address translation service 514 may have been pre-configured to respond to network address requests with the network address for a redirector service 516. In step 802, the address translation service 514 may determine whether the website in the network address request is compatible or not compatible based on its configuration data. If it is determined, in step 802, that the website is compatible, then the address translation service 514 may respond to the user web browser application 512 request with the network address of the requested website, as shown in step 803, and the method ends.

If or when it is determined, in step 802, that the website is not compatible, then the address translation service 514 may respond to the user web browser application 512 request with the network address of the redirector service 516, as shown in step 804. In step 805, the user web browser application 512 may send a website content request (e.g., an HTTP GET request)to the network address of the redirector service 516 provided by the address translation service 514 in step 804. In step 806, the redirector service 516 may receive the website content request and, in response to the request, the redirector service 516 may request a hosted compatible web browser application 722 from hosted web browser service 720. In step 807, the redirector service 516 may respond, to the user web browser application 512, with a response message that may comprise a client agent 518. The client agent 518 may comprise a plugin component, such as an ActiveX control or Java control or any other type and/or form of executable instructions capable of loading into and executing in the user web browser application 512. For example, the client agent 518 may comprise an ActiveX control loaded and run by a user web browser application 512, such as in the memory space or context of the user web browser application 512. In another embodiment, the redirector service 516 respond with a message that may comprise a designed and constructed program to obtain, download, or receive the client agent 518 via the first network 710 from another computing device and install the client agent 518. The client agent 518 may be pre-configured to present the content of the hosted compatible web browser application 722 within the user web browser application 512.

In step 808, the client agent 518 may connect to the hosted compatible web browser application 722 using a thin-client or remote-display protocol to present display output generated by the hosted compatible web browser application 722. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

In step 809, the hosted compatible web browser application 722 may navigate to the requested incompatible website 732 in full-screen mode. In step 810, the client agent 518 may present the content of the incompatible website 732 on the user web browser application 512 in a seamless and transparent manner such that it appears that the content is being displayed by the user web browser application 512. In other words, the user may be given the impression that the website content is displayed by the user web browser application 512 and not by the hosted compatible web browser application 722. The client agent 518 may transmit navigation commands generated by user web browser application 512 to the hosted compatible web browser application 722 using the thin-client or remote-display protocol. Changes to the display output of the hosted compatible web browser application 722, due to the navigation commands, may be reflected in the user web browser application 512 by the client agent 518, giving the impression to the user that the navigation commands were executed by the user web browser application 512.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:

receiving, by an address translation service in a secure network, from a user web browser application executing on a client computing device in the secure network, a first request for a website;

responsive to the first request, providing, by the address translation service, to the user web browser application executing on the client computing device, a network address of a redirector service in the secure network when the website meets predefined criteria, wherein providing the network address of the redirector service in the secure network to the user web browser application executing on the client computing device comprises determining, by the address translation service, that the website is not compatible with the user web browser application executing on the client computing device;

receiving, by the redirector service in the secure network, a second request for the website from the user web browser application executing on the client computing device;

requesting, by the redirector service in the secure network, from a virtualization server in an unsecured network, a hosted web browser application executing on the virtualization server in the unsecured network, wherein the request sent by the redirector service to the virtualization server identifies the website, and wherein the request sent by the redirector service to the virtualization server causes the virtualization server to:

retrieve content and properties of the website;

analyze the content and properties of the website; and determine, based on analyzing the content and properties of the website, a type and version of hosted web browser application to launch in response to the request received from the redirector service;

navigating the hosted web browser application executing on the virtualization server in the unsecured network to the website; and sending, by the redirector service in the secure network to the user web browser application executing on the client computing device, a client agent for execution within the user web browser application executing on the client computing device, wherein the client agent has been preconfigured to present the hosted web browser application executing on the virtualization server in the unsecured network.

2. The method of claim 1, wherein the network address of the redirector service provided by the address translation service comprises an internet protocol (IP) address.

3. The method of claim 1, wherein the network address of the redirector service provided by the address translation service comprises a uniform record locator (URL) address.

4. The method of claim 3, wherein the second request for the website received from the user web browser application comprises the uniform record locator address of the website.

5. The method of claim 4, wherein the redirector service transmits the uniform record locator of the website to the hosted web browser application.

6. The method of claim 1, wherein the address translation service comprises a domain name system (DNS) configured to provide, responsive to an address request for a first set of websites, the address of the redirector service, and responsive to an address request for a second set of websites, the address of the respective website within the second set of websites, based on predetermined criteria.

7. The method of claim 1, wherein the redirector service comprises a plurality of load-balanced redirector services.

8. The method of claim 1, wherein the virtualization server on which the hosted web browser application is executed is part of a hosted farm of virtualization servers providing hosted web browser applications.

9. The method of claim 8, wherein the request sent by the redirector service to the virtualization server for the hosted web browser application is sent to the virtualization server based on the virtualization server hosting a pre-launched hosted web browser application assigned to the request by the hosted farm.

10. A system comprising:
one or more processors; and
one or more memories storing instructions that, when executed by at least one processor of the one or more processors, cause the system to:
  receive, by an address translation service in a secure network, from a user web browser application executing on a client computing device in the secure network, a first request for a website;
  responsive to the first request, provide, by the address translation service, to the user web browser application executing on the client computing device, a network address of a redirector service in the secure network when the website meets predefined criteria, wherein providing the network address of the redirector service in the secure network to the user web browser application executing on the client computing device comprises determining, by the address translation service, that the website is not compatible with the user web browser application executing on the client computing device;
  receive, by the redirector service in the secure network, a second request for the website from the user web browser application executing on the client computing device;

request, by the redirector service in the secure network, from a virtualization server in an unsecured network, a hosted web browser application executing on the virtualization server in the unsecured network, wherein the request sent by the redirector service to the virtualization server identifies the website, and wherein the request sent by the redirector service to the virtualization server causes the virtualization server to:
  retrieve content and properties of the website;
  analyze the content and properties of the website; and
  determine, based on analyzing the content and properties of the website, a type and version of hosted web browser application to launch in response to the request received from the redirector service;
  navigate the hosted web browser application executing on the virtualization server in the unsecured network to the website; and
  send, by the redirector service in the secure network to the user web browser application executing on the client computing device, a client agent for execution within the user web browser application executing on the client computing device, wherein the client agent has been preconfigured to present the hosted web browser application executing on the virtualization server in the unsecured network.

11. The system of claim 10, wherein the network address of the redirector service provided by the address translation service comprises an internet protocol (IP) address.

12. The system of claim 10, wherein the network address of the redirector service provided by the address translation service comprises a uniform record locator (URL) address.

13. The system of claim 12, wherein the second request for the website received from the user web browser application comprises the uniform record locator address of the website.

14. The system of claim 13, wherein the redirector service transmits the uniform record locator of the website to the hosted web browser application.

15. The system of claim 10, wherein the address translation service comprises a domain name system (DNS) configured to provide, responsive to an address request for a first set of websites, the address of the redirector service, and responsive to an address request for a second set of websites, the address of the respective website within the second set of websites, based on predetermined criteria.

16. The system of claim 10, wherein the redirector service comprises a plurality of load-balanced redirector services.

17. The system of claim 10, wherein the virtualization server on which the hosted web browser application is executed is part of a hosted farm of virtualization servers providing hosted web browser applications.

18. The system of claim 17, wherein the request sent by the redirector service to the virtualization server for the hosted web browser application is sent to the virtualization server based on the virtualization server hosting a pre-launched hosted web browser application assigned to the request by the hosted farm.

19. One or more non-transitory computer-readable media storing instructions that, when executed by a system comprising one or more processors and one or more memories, cause the system to:
  receive, by an address translation service in a secure network, from a user web browser application executing on a client computing device in the secure network, a first request for a website;

responsive to the first request, provide, by the address translation service, to the user web browser application executing on the client computing device, a network address of a redirector service in the secure network when the website meets predefined criteria, wherein providing the network address of the redirector service in the secure network to the user web browser application executing on the client computing device comprises determining, by the address translation service, that the website is not compatible with the user web browser application executing on the client computing device;

receive, by the redirector service in the secure network, a second request for the website from the user web browser application executing on the client computing device;

request, by the redirector service in the secure network, from a virtualization server in an unsecured network, a hosted web browser application executing on the virtualization server in the unsecured network, wherein the request sent by the redirector service to the virtualization server identifies the website, and wherein the request sent by the redirector service to the virtualization server causes the virtualization server to:

retrieve content and properties of the website;
analyze the content and properties of the website; and
determine, based on analyzing the content and properties of the website, a type and version of hosted web browser application to launch in response to the request received from the redirector service;

navigate the hosted web browser application executing on the virtualization server in the unsecured network to the website; and send, by the redirector service in the secure network to the user web browser application executing on the client computing device, a client agent for execution within the user web browser application executing on the client computing device, wherein the client agent has been preconfigured to present the hosted web browser application executing on the virtualization server in the unsecured network.

20. The one or more non-transitory computer-readable media of claim 19, wherein the virtualization server on which the hosted web browser application is executed is part of a hosted farm of virtualization servers providing hosted web browser applications, and wherein the request sent by the redirector service to the virtualization server for the hosted web browser application is sent to the virtualization server based on the virtualization server hosting a pre-launched hosted web browser application assigned to the request by the hosted farm.

* * * * *